United States Patent
Drees

(10) Patent No.: US 10,935,940 B2
(45) Date of Patent: Mar. 2, 2021

(54) BUILDING MANAGEMENT SYSTEM WITH AUGMENTED DEEP LEARNING USING COMBINED REGRESSION AND ARTIFICIAL NEURAL NETWORK MODELING

(71) Applicant: Johnson Controls Technology Company, Auburn Hills, MI (US)

(72) Inventor: Kirk H. Drees, Cedarburg, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 19 days.

(21) Appl. No.: 16/054,805

(22) Filed: Aug. 3, 2018

(65) Prior Publication Data

US 2019/0041811 A1 Feb. 7, 2019

Related U.S. Application Data

(60) Provisional application No. 62/540,749, filed on Aug. 3, 2017.

(51) Int. Cl.
| | |
|---|---|
| G05B 13/04 | (2006.01) |
| G06N 3/08 | (2006.01) |
| G06K 9/62 | (2006.01) |
| G06N 7/00 | (2006.01) |
| G06K 9/00 | (2006.01) |
| G05B 15/02 | (2006.01) |
| G06N 3/04 | (2006.01) |

(52) U.S. Cl.
CPC .......... G05B 13/048 (2013.01); G05B 15/02 (2013.01); G06K 9/00496 (2013.01); G06K 9/6215 (2013.01); G06K 9/6223 (2013.01); G06N 3/0454 (2013.01); G06N 3/08 (2013.01); G06N 7/00 (2013.01); G06N 7/005 (2013.01); G05B 2219/25011 (2013.01)

(58) Field of Classification Search
CPC .... G05B 13/027; G05B 13/048; G05B 15/02; G05B 2219/25011; G06K 9/00496; G06K 9/6215; G06K 9/6223; G06N 3/0454; G06N 3/08; G06N 7/00; G06N 7/005
See application file for complete search history.

(56) References Cited

U.S. PATENT DOCUMENTS

| | | | | |
|---|---|---|---|---|
| 6,408,227 | B1 * | 6/2002 | Singhvi | C02F 1/008 700/266 |
| 10,520,905 | B2 * | 12/2019 | Cross | G05B 17/02 |
| 2010/0274745 | A1 * | 10/2010 | Seo | G06K 9/6269 706/12 |

(Continued)

Primary Examiner — Chad G Erdman
(74) Attorney, Agent, or Firm — Foley & Lardner LLP

(57) ABSTRACT

A building management system is provided. The building management system includes a database, a trust region identifier configured to perform a cluster analysis technique to identify trust regions, and a regression model predictor configured to utilize a regression model technique to calculate a regression model prediction. The building management system further includes a distance metric calculator configured to calculate a distance metric, an artificial neural network model predictor configured to utilize an artificial neural network model technique to calculate an artificial neural network model prediction, and a combined prediction calculator configured to determine a combined prediction based on the distance metric, the regression model prediction, and the artificial neural network model prediction.

12 Claims, 9 Drawing Sheets

(56) References Cited

U.S. PATENT DOCUMENTS

2015/0178865 A1\* 6/2015 Anderson .............. G05B 17/02
705/7.25
2015/0316907 A1 11/2015 Elbsat et al.
2016/0370258 A1 12/2016 Perez \* cited by examiner

BUILDING MANAGEMENT SYSTEM WITH AUGMENTED DEEP LEARNING USING COMBINED REGRESSION AND ARTIFICIAL NEURAL NETWORK MODELING

CROSS-REFERENCE TO RELATED PATENT APPLICATIONS

This application claims the benefit of and priority to U.S. Provisional Patent Application No. 62/540,749, filed Aug. 3, 2017, which is incorporated herein by reference in its entirety.

BACKGROUND

The present disclosure relates generally to the field of heating, ventilation and air conditioning (HVAC) control systems. The present disclosure relates more particularly to systems and methods for performing augmented deep learning (ADL) predictions using combined regression and artificial neural network (ANN) modeling techniques.

Building management systems may utilize models to predict the relationships between physical plant inputs and outputs. These relationships may be utilized in physical plant optimization, control optimization, fault detection and diagnosis, and various other building management analytics. Regression and ANN modeling techniques have complementary advantages and disadvantages when utilized to predict these relationships. For example, regression model predictions can be made immediately upon startup of the physical plant before a large set of operational data is collected, but tend to be less accurate than ANN model predictions. ANN model predictions require access to a larger data set, but result in more accurate predictions once the data set has been collected. A building management system that leverages the advantages of both modeling techniques would therefore be useful.

SUMMARY

One implementation of the present disclosure is a building management system. The building management system includes a database, a trust region identifier configured to perform a cluster analysis technique to identify trust regions, and a regression model predictor configured to utilize a regression model technique to calculate a regression model prediction. The building management system further includes a distance metric calculator configured to calculate a distance metric, an artificial neural network model predictor configured to utilize an artificial neural network model technique to calculate an artificial neural network model prediction, and a combined prediction calculator configured to determine a combined prediction based on the distance metric, the regression model prediction, and the artificial neural network model prediction.

In some embodiments, the combined prediction calculator uses a weighted average or a Kalman filter to determine the combined prediction.

In some embodiments, the distance metric calculator is configured to calculate the distance metric using plant input data and a cluster distribution mean or a cluster centroid. In other embodiments, the cluster distribution mean is identified using a Gaussian mixture model technique. In other embodiments, the cluster centroid is identified using a k-means technique.

In some embodiments, the plant input data includes manufacturing data and offsite data.

Another implementation of the present disclosure is a method for operating a building management system for a physical plant. The method includes creating a regression model using pre-operation data during a pre-operational stage of physical plant, identifying multiple data clusters generated by physical plant data during an operational stage, and determining whether the multiple data clusters exceeds a first data sufficiency threshold. If the multiple data clusters exceeds the first data sufficiency threshold, the method includes creating a first artificial neural network model using the multiple data clusters and determining whether new physical plant data meets a first similarity criterion of at least one of the data clusters. If the new plant data meets a first similarity criterion, the method includes making a first artificial neural network prediction using the first artificial neural network model and modifying a characteristic of the physical plant according to the first artificial neural network prediction.

In some embodiments, the pre-operation data includes manufacturing data and offsite data. In some embodiments, the physical plant data includes plant input data or plant output data.

In some embodiments, the first data sufficiency threshold is based on a quantity of physical plant data.

In some embodiments, the method further includes making a regression model prediction using the regression model in response to a determination that the multiple data clusters does not exceed the first data sufficiency threshold and utilizing the regression model prediction to perform a fault detection task, a fault diagnosis task, or a control task.

In some embodiments, the method further includes utilizing the first artificial neural network prediction as an input to the regression model. The first artificial neural network prediction is configured to improve a quality of the regression model.

In some embodiments, the method further includes determining whether the multiple data clusters exceeds a second data sufficiency threshold and creating a second artificial neural network model using the multiple data clusters in response to a determination that the multiple data clusters exceeds the second data sufficiency threshold. The method further includes determining whether new physical plant data meets a second similarity criterion of at least one of the multiple data clusters, and in response to a determination that the new plant data meets the second similarity criterion, making a second artificial neural network prediction using the second artificial neural network model. In other embodiments, the method further includes determining a combined prediction based on the first artificial neural network prediction and the second artificial neural network prediction.

Yet another implementation of the present disclosure is a method of making an augmented deep learning model prediction. The method includes receiving plant input data and plant output data from a physical plant, performing a cluster analysis technique to identify trust regions, calculating a regression model prediction using a regression model technique based on plant input data and plant output data, and calculating a distance metric. The method further includes calculating an artificial neural network prediction using an artificial neural network technique based on plant input data, plant output data, and the distance metric, determining a combined prediction based on the distance metric and at least one of the regression model prediction or the artificial neural network prediction, modifying a characteristic of the physical plant according to the combined prediction.

In some embodiments, determining the combined prediction includes use of a weighted average or a Kalman filter.

In some embodiments, calculating the distance metric includes use of plant input data and a cluster distribution mean or a cluster centroid. In other embodiments, the cluster distribution mean is identified using a Gaussian mixture model technique. In other embodiments, the cluster centroid is identified using a k-means technique.

In some embodiments, the plant input data includes manufacturing data or offsite data.

DETAILED DESCRIPTION

Overview

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, various systems and methods for making augmented deep learning (ADL) predictions using combined regression and artificial neural network (ANN) modeling techniques in the operation of a building management system are shown. The combination of the modeling techniques leverages the advantages of both: predictions resulting from regression models are utilized in early operational stages when a lack of sufficient data makes ANN predictions impossible or inadvisable, while more accurate ANN predictions are utilized once a sufficient body of operational data has been collected. In some cases, regression model predictions are provided as input to the ANN model and vice versa, increasing the quality of the predictions from both the regression and ANN models.

Building Management System and HVAC System

Figure 1:
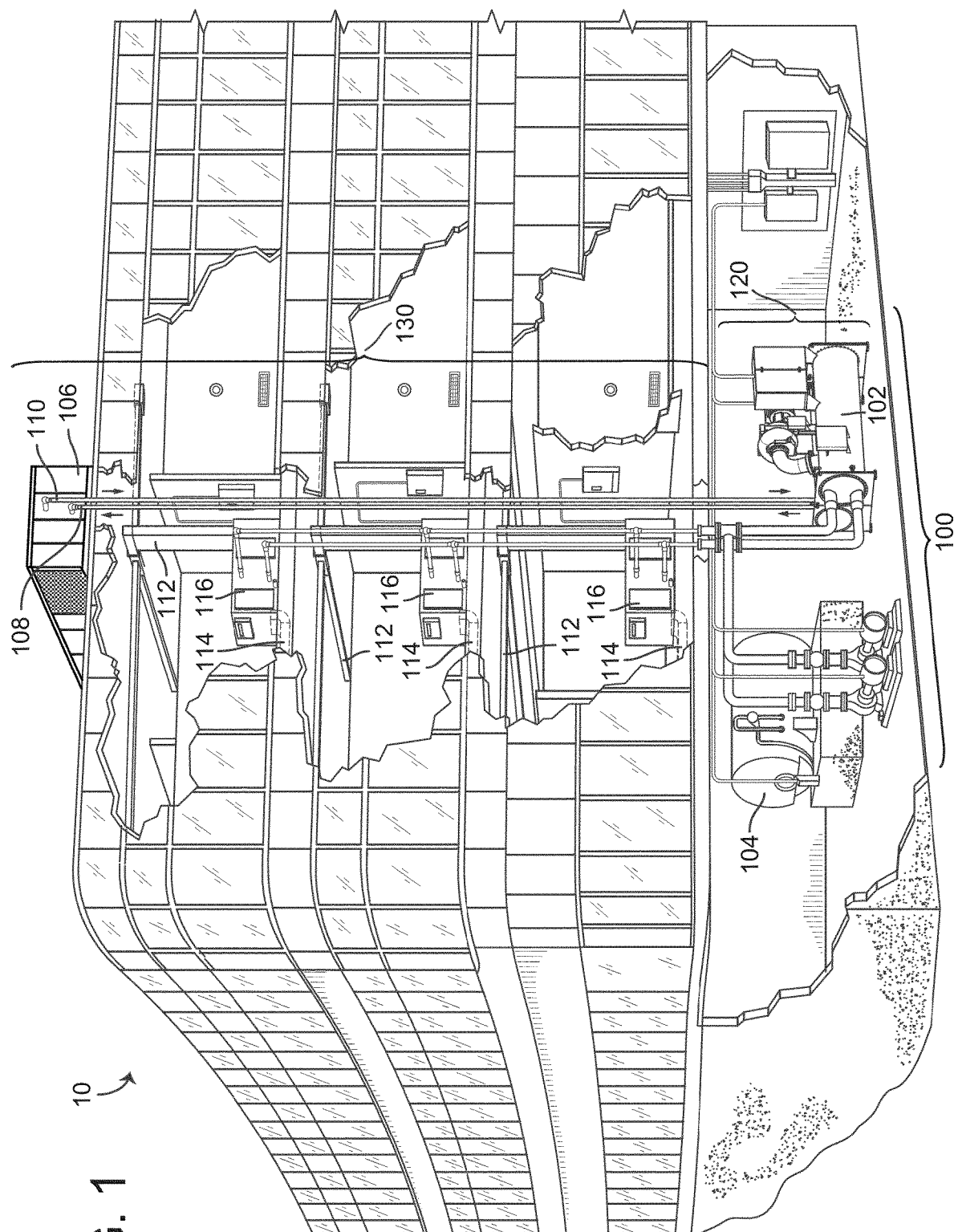
FIG. 1 is a perspective view of a building served by a building management system (BMS), according to some embodiments.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown, according to an exemplary embodiment. Building 10 is serviced by a building management system including a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
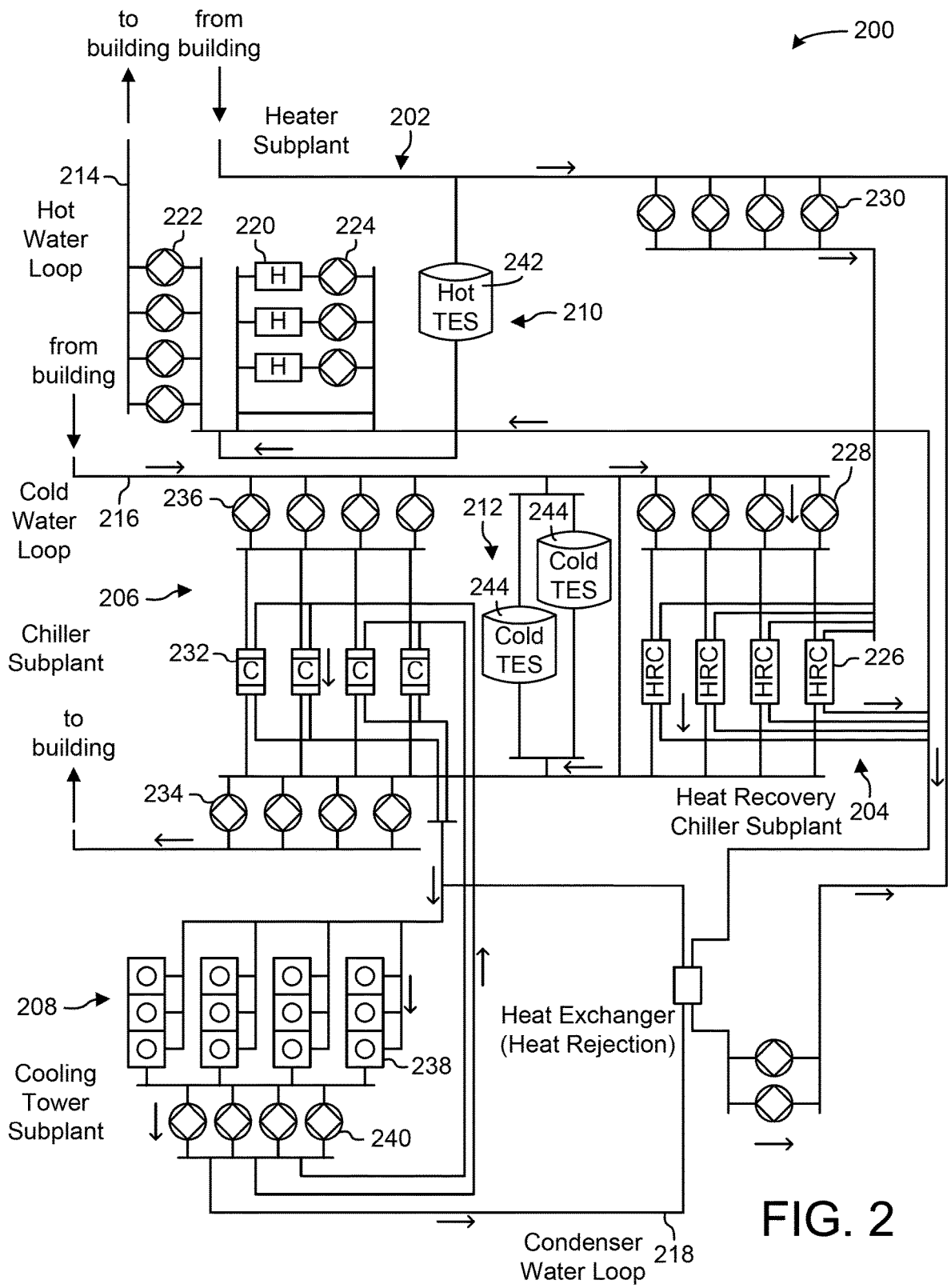
FIG. 2 is a block diagram of a waterside system which may be used in conjunction with the BMS of FIG. 1, according to some embodiments.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
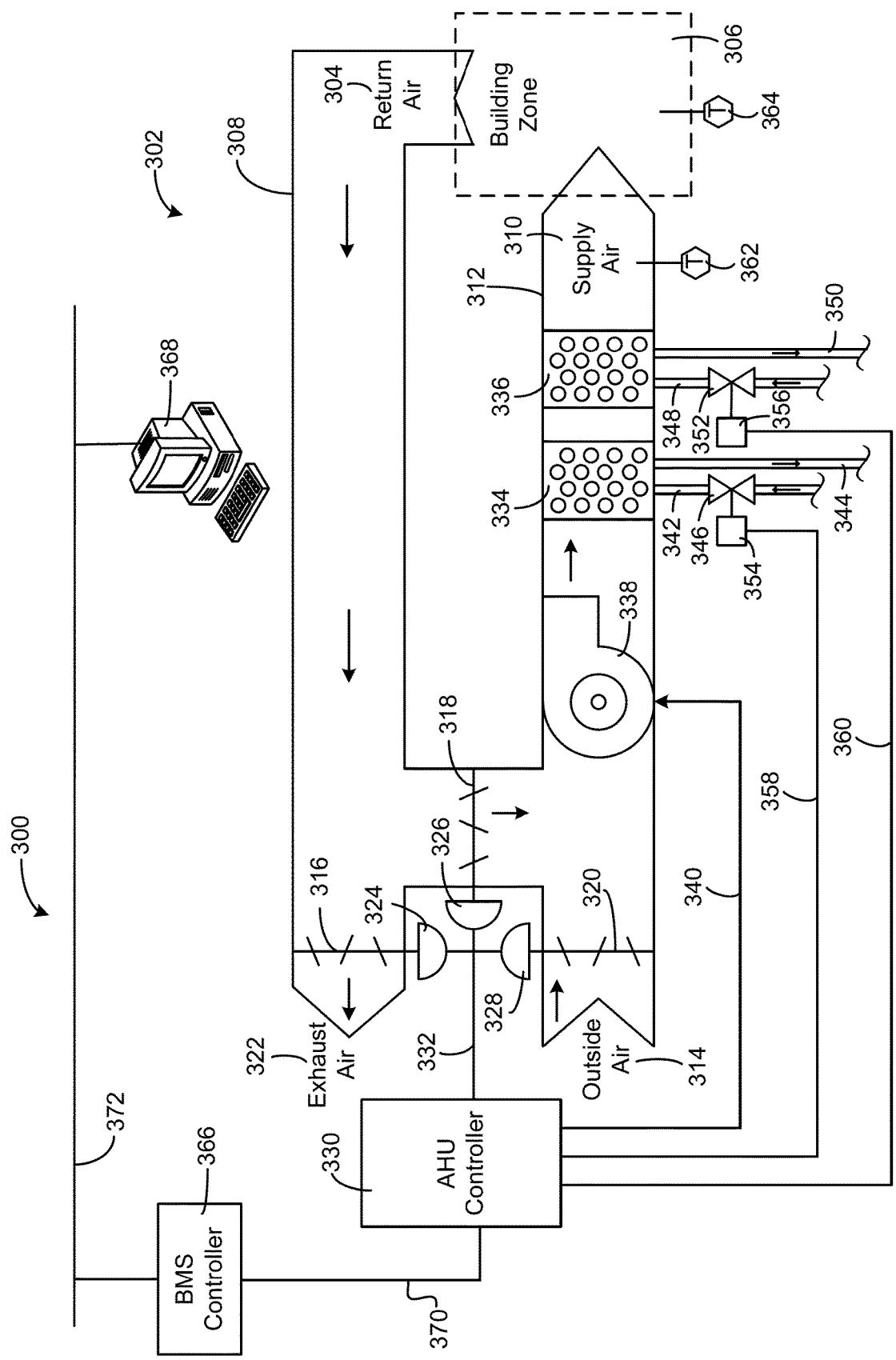
FIG. 3 is a block diagram of an airside system which may be used in conjunction with the BMS of FIG. 1, according to some embodiments.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314.

AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
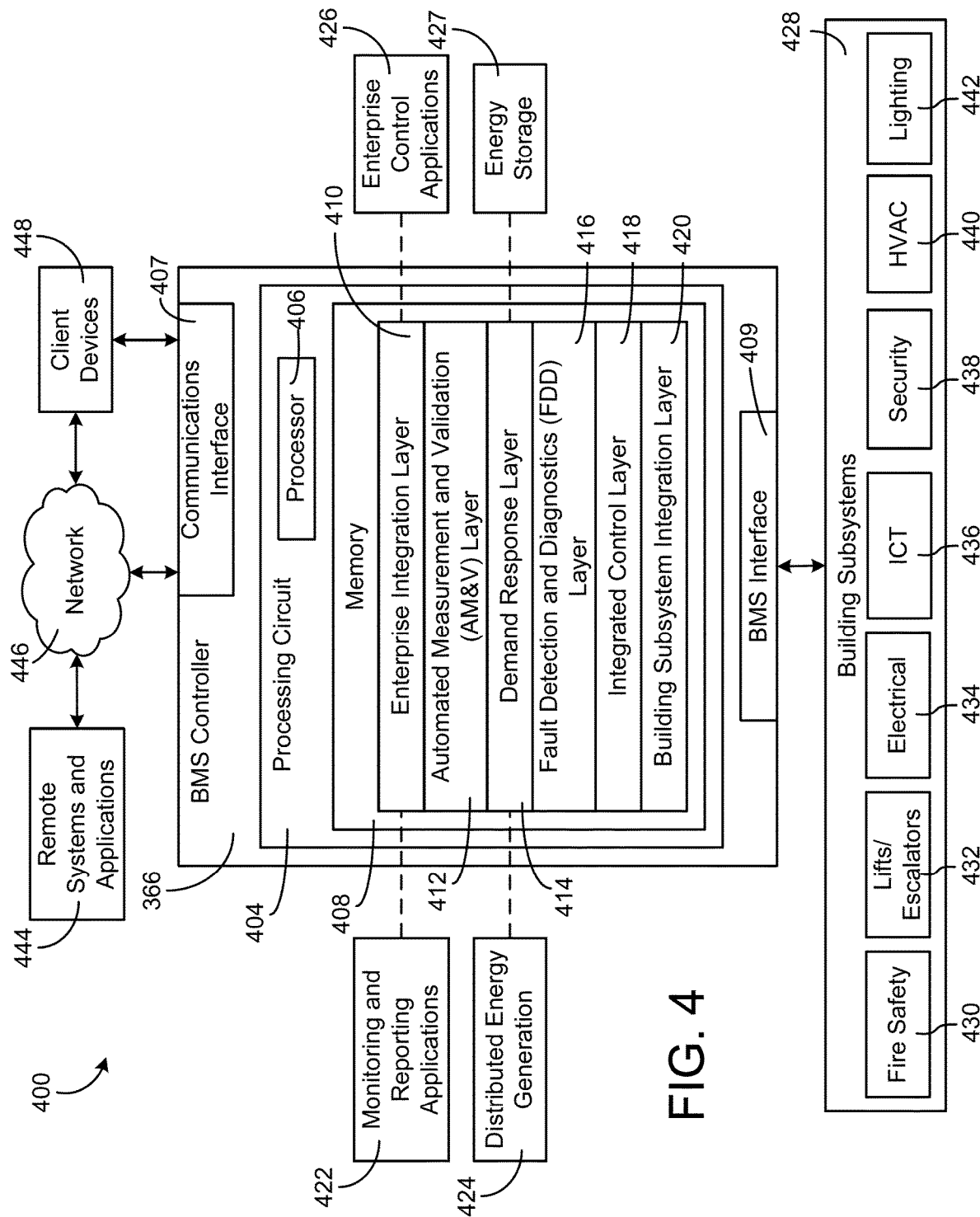
FIG. 4 is a block diagram of the BMS of FIG. 1, according to some embodiments.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Augmented Deep Learning Techniques

Figure 5:
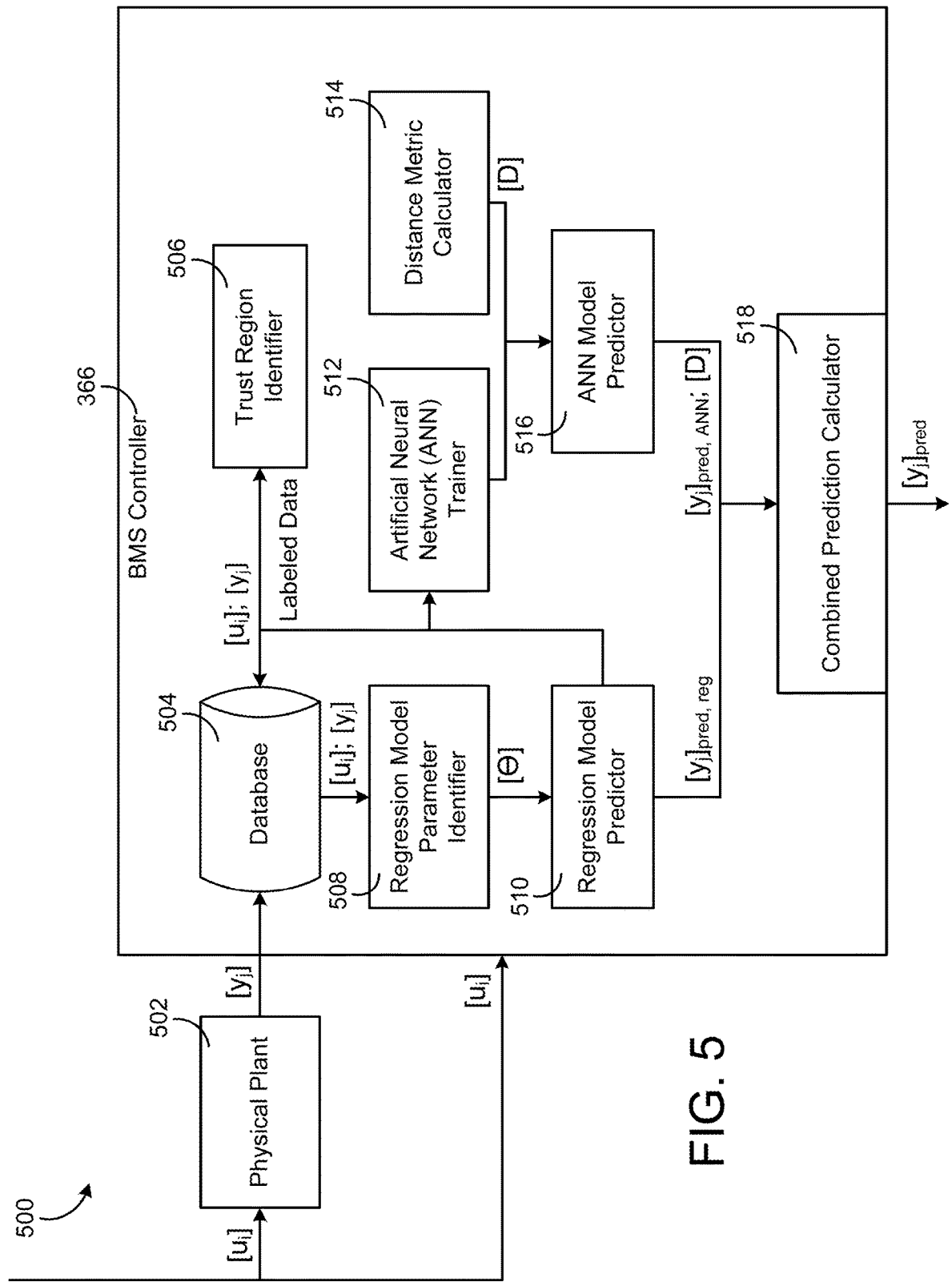
FIG. 5 is a block diagram of a BMS configured to perform ADL predictions using combined regression and ANN modeling techniques, according to some embodiments.

Turning now to FIG. 5, a block diagram of a BMS 500 configured to perform augmented deep learning (ADL) predictions using combined regression and artificial neural networks (ANN) modeling techniques is shown. BMS 500 is shown to include a physical plant 502. Physical plant 502 represents the physical process, processes, or physics that convert plant inputs into outputs. Plant inputs may be represented mathematically as a vector $[u_i]$ with length i, while plant outputs may be represented as a vector $[y_j]$ with length j. For example, if physical plant 502 is representative of a central plant, the lengths i and j of the input vector $[u_i]$ and output vector $[y_j]$ may exceed 50.

Inputs $[u_i]$ and outputs $[y_j]$ may originate from a variety of sources, including detailed physics-based simulations (e.g., based on manufacturer data or equipment design models), historical data, and typical values either known from experience or obtained from similar plants. In various embodiments, the model representing physical plant 502 may be linear or non-linear, and in some arrangements, the model may be of high order. If the physical plant 502 operates dynamically, then the output of physical plant 502 will include estimated time constants so that alignment between steady state inputs and outputs can be obtained. The objective of the ADL prediction is to predict the relationship between the inputs $[u_i]$ and outputs $[y_j]$ of the physical plant 502.

The process of making an ADL prediction may be performed by BMS controller 366, described above with reference to FIGS. 3-4. BMS controller 366 is shown to include, among other components, a database 504, modules related to regression modeling techniques, modules related to ANN modeling techniques, and a combined prediction calculator 518 that utilizes the combined outputs of the regression modeling modules and the ANN modeling modules. Database 504 is configured to store plant inputs $[u_i]$ and outputs $[y_j]$. In some embodiments, database 504 is additionally configured to store labeled data for identified data clusters or trust regions (see trust region identifier 506, described in further detail below). Labeled data for identified trust regions may include labels, statistics, and centroid locations of trust regions. In some embodiments, historical data related to physical plant 502 is available and can be used as plant input data for filling database 504. In some embodiments, this historical or pre-operation data for the physical plant 502 includes equipment manufacturer data or data collected from physical plants other than physical plant 502. In other embodiments, database 504 is initially empty upon initiation of the ADL prediction process.

Modules of BMS controller 366 related to regression modeling may include a regression model parameter identifier 508 and a regression model predictor 510. Regression modeling is a statistical process for estimating the relationship among variables. Typically, regression modeling involves minimization of the $L_2$ norm so that estimated model parameters will minimize the sum of the prediction errors squared. An advantage of regression models is that, when designed properly, low order models may be used effectively for both interpolation and extrapolation. Another advantage is that regression models are effective at modeling dominant relationships between inputs and outputs even when minimal data is available to estimate parameters. However, regression modeling techniques generally have lower predictive power when compared with a fully trained ANN model.

In various embodiments, the regression model may use a combination of a deterministic model and a stochastic model. In short, a deterministic model is one in which every set of variable states is uniquely determined by parameters in the model and by sets of previous states of these variables. In other words, a deterministic model always performs the same way for a given set of initial conditions. By contrast, in a stochastic model, which may be alternatively referred to as a statistical model, variable states are not described by unique values, but by probability distributions. Because the stochastic model portion of the regression model operates to drive the error in the model to zero, regression modeling yields good predictions even when relatively little data is available to the model. (As described in further detail below, ANN modeling yields better predictions when more data is available to the model.) Further details of a method for using a combination of deterministic and stochastic models in regression modeling may be found in U.S. patent application Ser. No. 14/717,593 filed May 20, 2015. The entire disclosure of U.S. patent application Ser. No. 14/717,593 is incorporated by reference herein.

Regression model parameter identifier 508 is configured to estimate the regression model parameters (i.e., [Θ]) and in some cases pre-process the plant inputs [$u_i$] to remove non-significant inputs (i.e., a stepwise regression technique) and/or reduce the number of model inputs by creating linear combinations of the original inputs (i.e., a latent variable technique) or by performing input transformations (i.e., a principal components analysis (PCA) technique). Further details of a PCA technique may be found in U.S. patent application Ser. No. 14/744,761 filed Jun. 19, 2015. The entire disclosure of U.S. patent application Ser. No. 14/744,761 is incorporated by reference herein. The purpose of the pre-processing performed by regression model parameter identifier 508 is to yield either a low-order physics-based model, also known as a "grey box" model, or a low order empirical model that has good predictive power for both interpolation and extrapolation.

Regression model predictor 510 is configured to predict a current output (i.e., [$y_j$]$_{pred,reg}$) calculated from the plant inputs [$u_i$], or the modified inputs determined by regression model parameter identifier 508. Regression model predictor 510 may utilize any suitable regression modeling technique to yield [$y_j$]$_{pred,reg}$. For example, if a prediction of chiller power is desired, a reduced order physics-based model (e.g., a Gordon-Ng Universal Chiller Model) may be utilized. Alternatively, since chiller power is a function of both load and lift, a linear bi-quadratic empirical model may be utilized. In some embodiments, the parameters estimated by regression model parameter identifier 508 and the predictions executed by regression model predictor 510 are performed simultaneously and independently from the ANN predictions executed by the ANN modules. In other embodiments, the predictions from the regression model predictor 510 are provided as input to the ANN modules to improve the ANN predictions. Similarly, ANN predictions may be provided as input to the regression modules to improve the regression model predictions.

Modules of BMS controller 366 related to ANN modeling may include trust region identifier 506, distance metric calculator 512, ANN trainer 514, and ANN model predictor 516. ANNs, also referred to as "deep learning" or connectionist systems, are computing systems inspired by biological neural networks. A typical ANN consists of thousands of interconnected artificial neurons, which are stacked sequentially in rows known as layers, forming millions of connections. ANNs may be applied to provide non-linear mapping between inputs and labeled data, and they are very effective at modeling complex non-linear relationships even if the modeler has no understanding of the process being modeled. However, ANNs have several implementation and operational disadvantages. One disadvantage is that a large volume of training data, including labeled data, is required and significant computational resources are required for training. Significant resources may also be involved if a human is required to label the data. Further disadvantages of ANNs include the fact that they do not provide a causal explanation of the relationship between the inputs and the resulting predictions. They are also unsuitable for extrapolation and interpolation in regions where training data was sparse or absent since predicted outputs can often have little relationship with the physical reality.

Trust region identifier 506 may be configured to receive stored plant inputs [$u_i$] from database 504 and employ cluster analysis to identify data clusters within the i dimensional hyperspace. Options for the cluster analysis technique include, but are not limited to, Gaussian Mixture Model (GMM) and k-means techniques. In various embodiments, trust region identifier 506 is configured to give each identified cluster or trust region a label so that it can be uniquely identified. Regardless of the cluster analysis technique utilized, over time and as additional data becomes available, new trust regions will be created, older trust regions will consolidate, and voids in the i dimensional hyperspace will be reduced until eventually the entire hyperspace is spanned by a single trust region. In some embodiments, trust region identifier 506 operates independently of the application consuming the ADL predictions.

GMMs are composed of multiple multivariate normal density functions. For each cluster, the GMM provides both an i dimensional mean vector and an i×i dimensional covariance matrix that are useful for understanding both the cluster location and how the data is distributed within the cluster. In some embodiments, GMMs utilize posterior probabilities to determine member in a cluster. The "best" number of clusters within the i dimensional hyperspace can be determined using a variety of techniques, including Principal Component Analysis (PCA) or Akaike Information Criterion (AIC). By contrast, k-means clustering determines membership by minimizing distances from points to the mean or median location of its assigned cluster. For each cluster, the k-means technique provides the centroid location. In addition, the total sum of the distances may be utilized to determine the ideal number of clusters to be identified.

Still referring to FIG. 5, ANN trainer 512 may be configured to train the ANN for each identified trust region. Periodically, new data previously identified as belonging to a trust region (i.e., by trust region identifier 506) may be utilized to provide additional training data for the associated ANNs. This additional training data allows the predictive power of the ANNs to increase over time. In some embodiments, ANN trainer 514 operates offline and independently with respect to the application consuming the ADL predictions.

Distance metric calculator 514 may be configured to calculate a distance metric between a given input [$u_i$] and a nearby trust region. For example, the distance metric may be between an input [$u_i$] and a cluster distribution mean identified via a GMM technique or a cluster centroid identified via a k-means technique. The distance metric may be calculated using any suitable technique (e.g., a Euclidean distance, a Mahalanobis distance). ANN model predictor 516 is configured to calculate ANN predictions [$y_j$]$_{pred,ANN}$ of nearby trust regions. Classification of "nearby" may be determined based on the distance metric determined by the distance metric calculator 514, or, in the case of trust regions identified by a GMM technique, the distance metric and co-variance information. In some embodiments, both distance metric calculator 514 and ANN model predictor 516 are configured to operate synchronously with the application consuming the ADL predictions.

Combined prediction calculator 518 is configured to determine ADL predictions based on the regression model prediction input (i.e., [$y_j$]$_{pred,reg}$) received from regression model predictor 510 and the ANN model prediction input (i.e., [$y_j$]$_{pred,ANN}$) received from ANN model predictor 516. Any suitable technique may be utilized to combine the regression and ANN model predictions. For example, combination techniques may include, but are not limited to, Kalman filtering, linear combinations, and non-linear combinations. The combined prediction calculator 518 may be configured to operate synchronously with the application consuming the ADL predictions. Further details regarding the combined ADL predictions are included below with reference to FIGS. 8-9.

Figure 6:
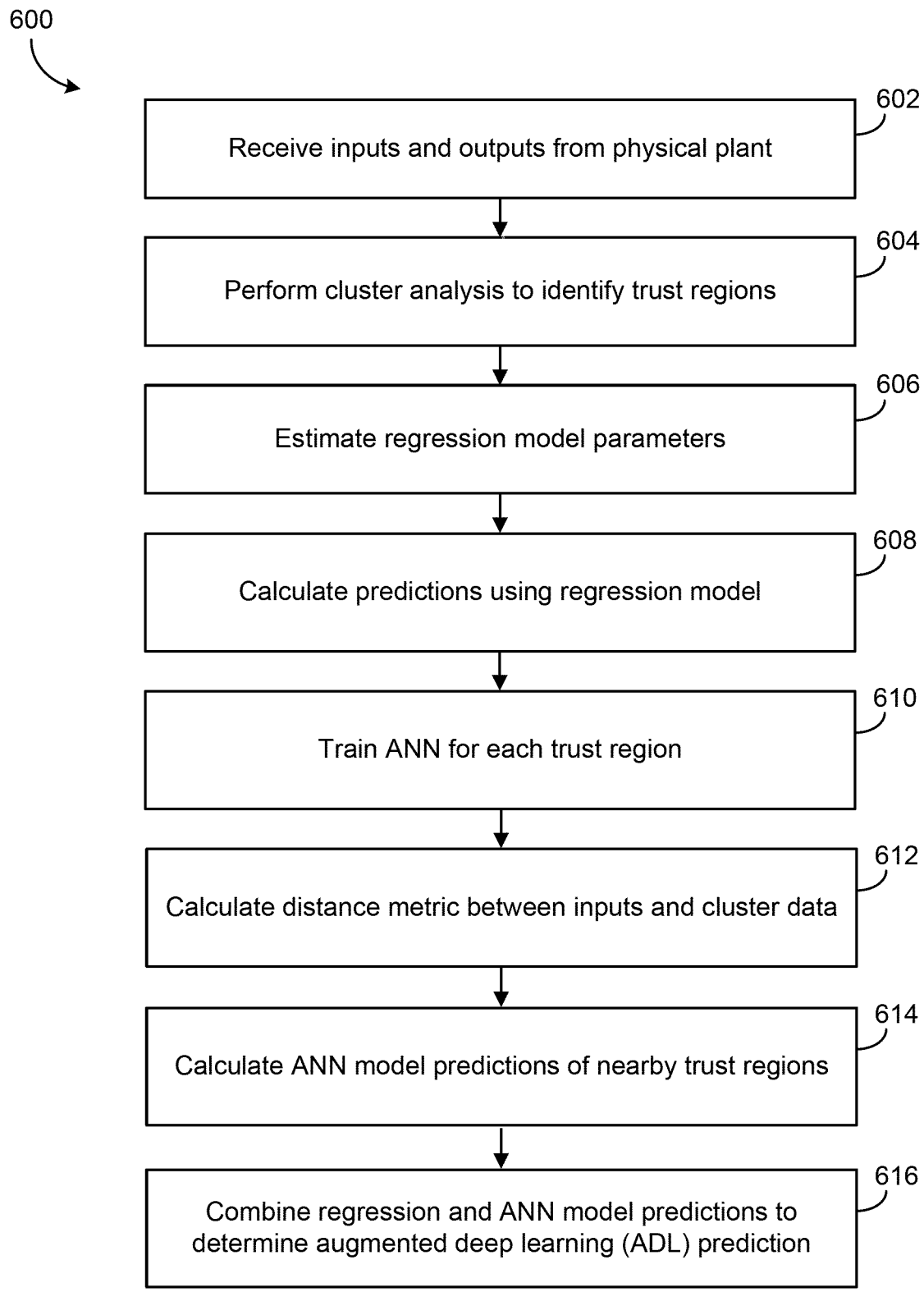
FIG. 6 is a flow diagram illustrating a process for performing ADL predictions using combined regression and ANN modeling techniques, according to some embodiments.

Referring now to FIG. 6, a flow diagram illustrating a process 600 for using augmented deep learning techniques to make modeling predictions is shown. In some embodiments, process 600 is performed by BMS controller 366 of BMS 400. Process 600 is shown to begin with step 602, in which database 504 receives physical outputs from the physical plant 502. In some embodiments, the physical outputs are a vector [$y_j$] with length j. At step 604, trust region identifier 506 performs cluster analysis methods to identify trust regions (e.g., via a GMM or a k-factors technique).

At step 606, regression model parameter identifier 508 estimates the parameters for the regression model. In some embodiments, step 606 includes removing non-significant inputs or reducing the number of model inputs via linear combinations of the original inputs and/or input transformations. Continuing with step 608, regression model predictor 510 calculates regression model predictions (i.e., $[y_j]_{pred,reg}$) based on parameter input received from regression model parameter identifier 508. In various embodiments, the regression model prediction includes both a deterministic and a stochastic component and may be calculated via a variety of regression model techniques (e.g., a reduced order physics-based model, a linear quadratic empirical model).

At step 610, ANN trainer 512 receives inputs from database 504 and trust region identifier 506 to train the ANN for each identified trust region. Periodically providing ANN trainer 512 with new data may increase the predictive power of the ANN model over time. In some embodiments, step 610 is not performed until one or more data sufficiency thresholds is exceeded. In various embodiments, the data sufficiency threshold may be based on the amount of data received from the database 504. The amount of data stored in the database 504 (e.g., plant input data, plant output data) may be related to the amount of time the physical plant 502 has been operational. Continuing with step 612, the distance metric calculator 514 calculates a distance metric (e.g., a Euclidean distance, a Mahalanobis distance) between the inputs [$u_i$] and the cluster distribution means (i.e., if a GMM technique has been utilized to identify the trust regions) or the cluster centroids (i.e., if a k-means technique has been utilized to identify the trust regions). At step 614, ANN model predictor 516 makes an ANN model prediction based on input received from ANN trainer 512 and distance metric calculator 514. As described above, in some embodiments, the ANN model prediction may be utilized as an input to the regression model predictor 510 to improve the quality of the regression model predictions.

In some embodiments, the steps comprising the regression model prediction (i.e., steps 606 and 608) occur simultaneously with the steps comprising the ANN model prediction (i.e., steps 610-614). In other embodiments, the steps comprising the regression model prediction are performed during a pre-operational stage of the physical plant 502 and before sufficient data has been collected from the physical plant 502 to perform the steps comprising the ANN model prediction.

Process 600 concludes at step 616 as combined prediction calculator 518 utilizes the regression model prediction (i.e., $[y_j]_{pred,reg}$) and the ANN model prediction (i.e., $[y_j]_{pred,ANN}$) to determine an ADL prediction. In various embodiments, combined prediction calculator 518 uses any suitable technique (e.g., Kalman filters, linear combinations, non-linear combinations) to determine the combined prediction from the regression model prediction and the ANN model prediction. In various embodiments, the combined prediction calculator 518 may utilize the regression model prediction, one ANN model prediction, multiple ANN predictions, or any combination thereof to determine the ADL prediction. The ADL prediction may be utilized to modify an operating characteristic of the physical plant 502. For example, the ADL prediction may be used to optimize control of the equipment in HVAC system 100, waterside system 200, or airside system 300. In other embodiments, the ADL prediction can be used to perform fault detection tasks, fault diagnostic tasks, or other tasks related to analytics.

Figure 7:
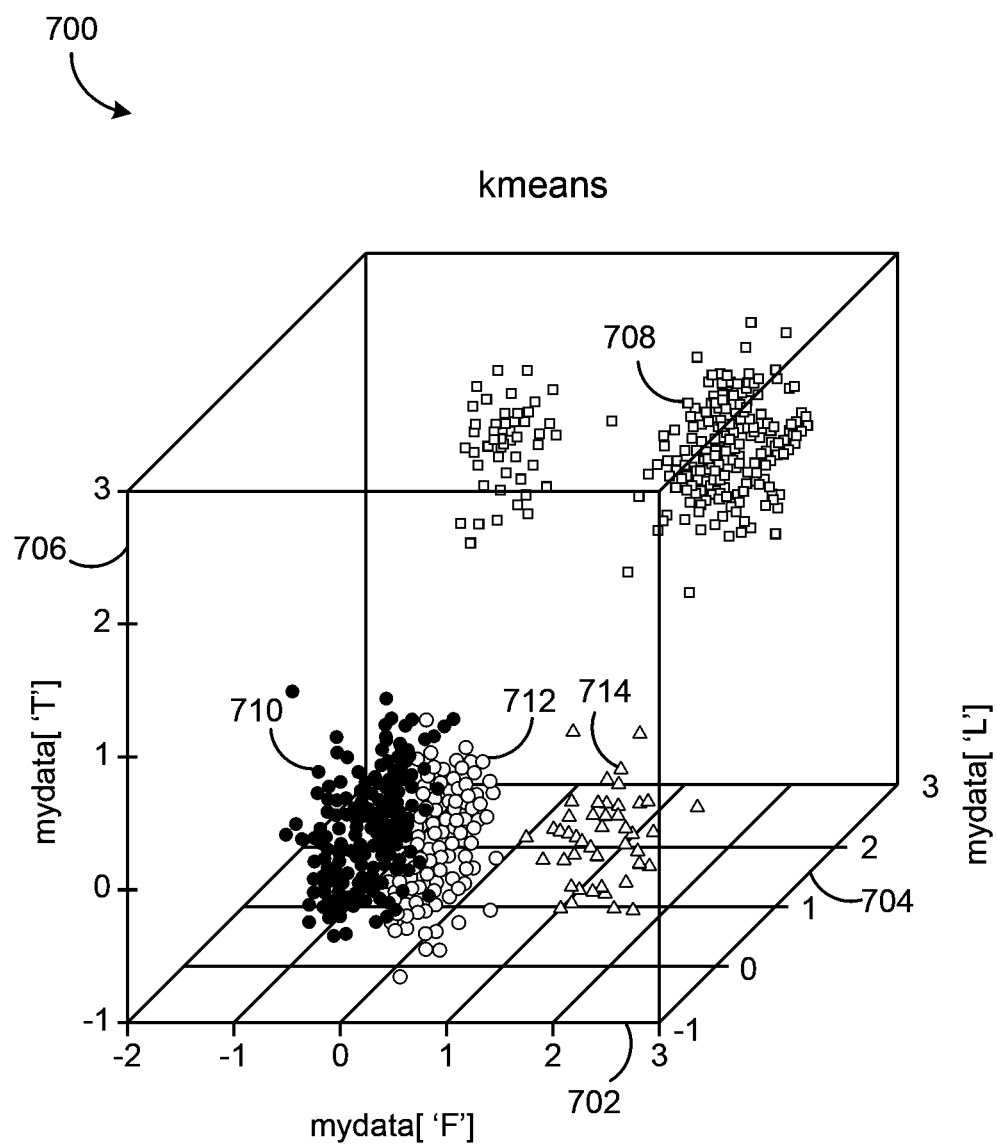
FIG. 7 is a plot of data clusters used to identify trust regions, according to some embodiments.

Referring now to FIG. 7, a plot 700 of trust regions as identified by a k-means technique is depicted, according to some embodiments. As described above, trust regions may include regions of i dimensional hyperspace (represented in plot 700 by axes 702, 704, and 706) where input [$u_i$] is sufficiently dense to train an ANN. As shown in the plot 700, data is clustered in four discrete regions 708, 710, 712, and 714, which may lead to the identification of four trust regions. In some embodiments, the k-means technique is performed by trust region identifier 506.

Figure 8:
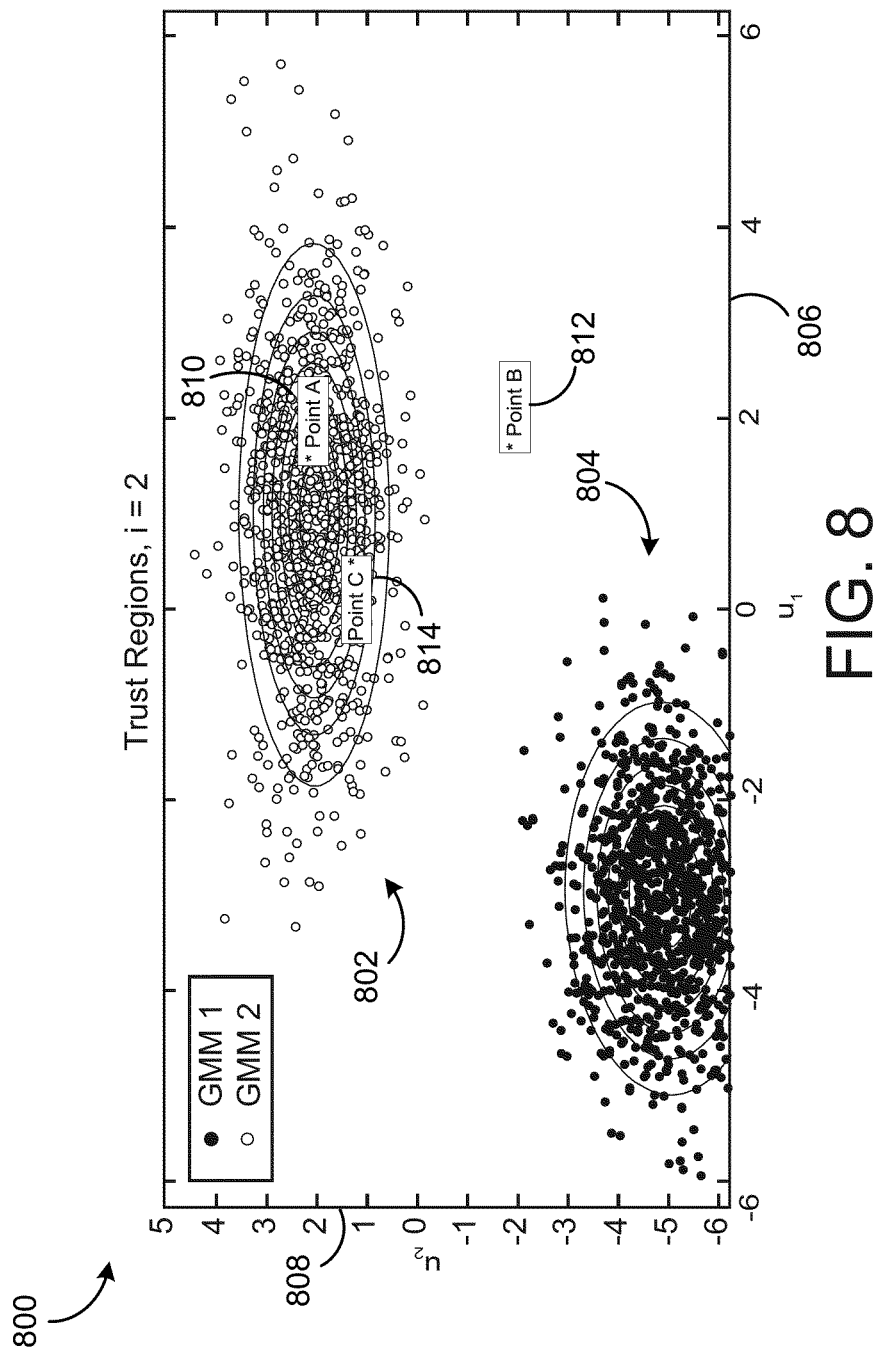
FIG. 8 is a plot of ADL predictions for trust regions identified using Gaussian Mixture Modeling (GMM) techniques, according to some embodiments.

Turning now to FIG. 8, a plot 800 of ADL predictions for trust regions identified using Gaussian Mixture Modeling (GMM) techniques is shown, according to some embodiments. As shown, plot 800 depicts a first trust region 802 and a second trust region 804 plotted along first axis 806 and second axis 808. The trust regions 802 and 804 may be utilized as similarity criteria to determine whether one or more ANN model predictions should be utilized in whole or in part in the ADL prediction. For example, if input [$u_i$] is located within the 68% confidence limits of the nearest trust region (i.e., Point A, represented by 810), then the ANN model prediction is used exclusively without regard to the regression model prediction:

$$[y_j]_{pred,ADL}(u_i)=[y_j]_{pred,ANN}(u_i)$$

By contrast, if input [$u_i$] is located outside of the 99% confidence limits of the nearest trust region (i.e., Point B, represented by 812), then the regression model prediction is used exclusively without regard to the ANN model prediction:

$$[y_j]_{pred,ADL}(u_i)=[y_j]_{pred,reg}(u_i)$$

If, however, input [$u_i$] is located between the 68% and 99% confidence limits of the nearest trust region (i.e., Point C, represented by 814), then the ADL model prediction is a continuous function of both the ANN model prediction and the regression model prediction: For example, in some embodiments, the continuous function includes a weighted average or a Kalman filter.

$$[y_j]_{pred,ADL}(u_i)=f([y_j]_{pred,ANN}(u_i),[y_j]_{pred,reg}(u_i))$$

Figure 9:
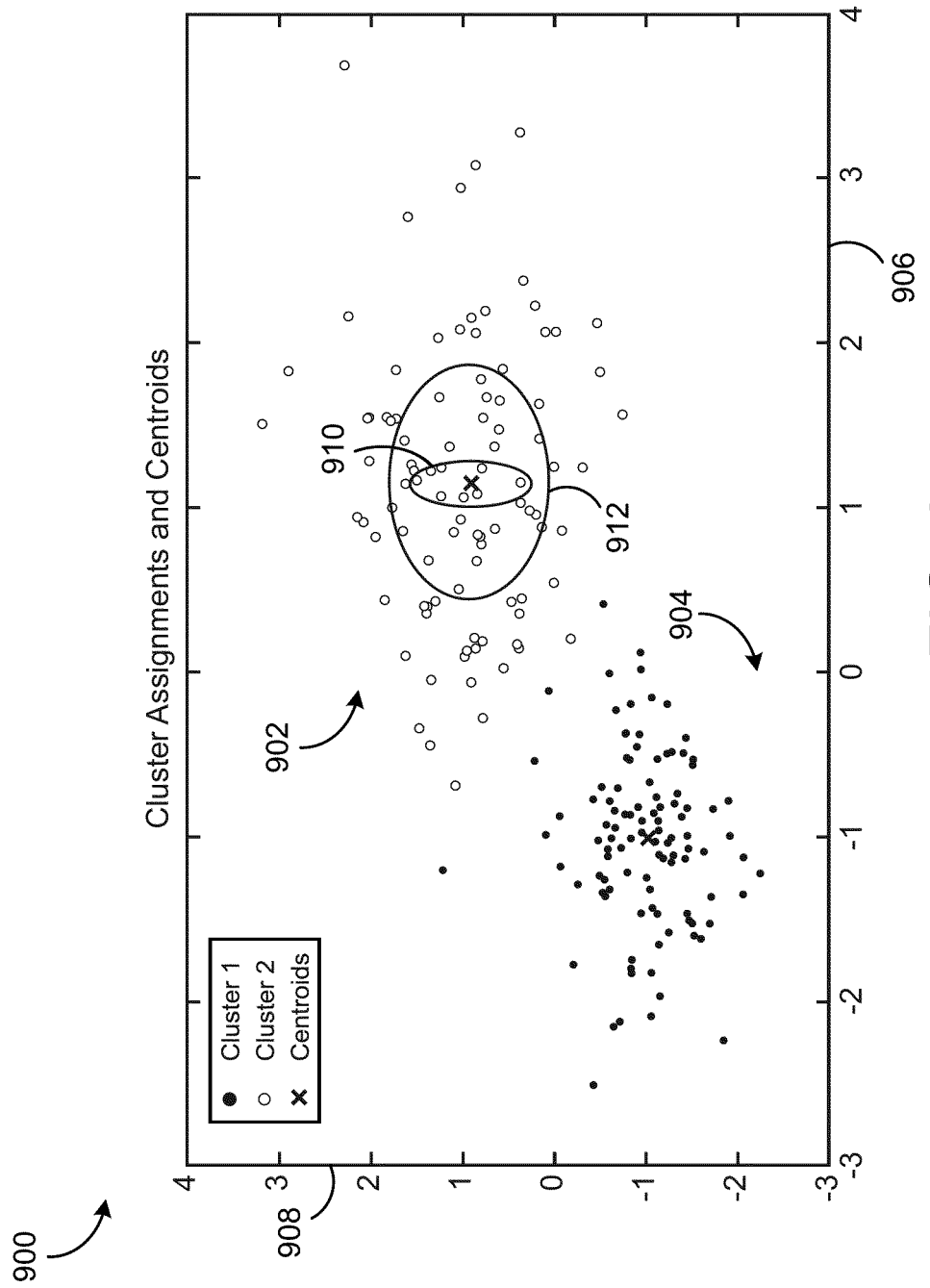
FIG. 9 is a plot of ADL predictions for trust regions identified using cluster centroid (k-means) techniques, according to some embodiments.

Referring now to FIG. 9, a plot 900 of ADL predictions for trust regions identified using cluster centroid (k-means) techniques is shown, according to some embodiments. As shown, plot 900 depicts a first trust region 902 and a second trust region 904 plotted along first axis 906 and second axis 908. The trust regions 902 and 904 may be utilized as similarity criteria to determine whether one or more ANN model predictions should be utilized in whole or in part in the ADL prediction. If input [$u_i$] is located within a predetermined distance from the nearest trust region centroid (i.e., inside the region 910 bounded by the vertically-oriented ellipse), then the ANN prediction is used exclusively without regard to the regression model prediction:

$$[y_j]_{pred,ADL}(u_i)=[y_j]_{pred,ANN}(u_i)$$

Conversely, if input $[u_i]$ is located outside the second predetermined distance from the nearest trust region centroid (i.e., outside the region 912 bounded by the horizontally-oriented ellipse), then the regression model prediction is used exclusively without regard to the ANN model prediction:

$$[y_j]_{pred,ADL}(u_i)=[y_j]_{pred,reg}(u_i)$$

If, however, input $[u_i]$ is located in the region between the bounded trust regions (i.e., between regions 910 and 912), then the ADL model prediction is a continuous function of both the ANN model prediction and the regression model prediction based on the distance of the input $[u_i]$ from the cluster centroid:

$$[y_j]_{pred,ADL}(u_i)=f([y_j]_{pred,ANN}(u_i),[y_j]_{pred,reg}(u_i),\text{distance})$$

Although the systems and methods described above have been described exclusively with reference to control of the environmental conditions of a building via a building management system (e.g., making predictions of a required chiller power), ADL predictions made from a combination of regression and ANN model predictions may be utilized in a variety of applications. For example, the ADL prediction techniques described herein may be useful in the fields of video processing, image recognition, object identification, threat modeling, fault detection, and industrial configuration optimization.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   a database configured to store at least one of plant input data, plant output data, or identified trust region data;
   a trust region identifier configured to perform a cluster analysis technique to identify trust regions;
   a regression model predictor configured to utilize a regression model technique to calculate a regression model prediction based at least in part on plant input data and plant output data;
   a distance metric calculator configured to calculate a distance metric;
   an artificial neural network model predictor configured to utilize an artificial neural network model technique to calculate an artificial neural network model prediction based at least in part on the plant input data, the plant output data, and the distance metric; and
   a combined prediction calculator configured to determine a combined prediction based on the distance metric and at least one of the regression model prediction or the artificial neural network model prediction; and
   a controller configured to modify a characteristic of a physical plant based on the combined prediction.

2. The building management system of claim 1, wherein the combined prediction calculator uses at least one of a weighted average or a Kalman filter to determine the combined prediction.

3. The building management system of claim 1, wherein the distance metric calculator is configured to calculate the distance metric using plant input data and at least one of a cluster distribution mean or a cluster centroid.

4. The building management system of claim 3, wherein the cluster distribution mean is identified using a Gaussian mixture model technique.

5. The building management system of claim 3, wherein the cluster centroid is identified using a k-means technique.

6. The building management system of claim 1, wherein the plant input data comprises at least one of manufacturing data and offsite data.

7. A method of making an augmented deep learning model prediction comprising:
   receiving plant input data and plant output data from a physical plant;
   performing a cluster analysis technique to identify trust regions;
   calculating a regression model prediction using a regression model technique based at least in part on the plant input data and the plant output data;
   calculating a distance metric;

calculating an artificial neural network prediction using an artificial neural network technique based at least in part on plant input data, plant output data, and the distance metric;

determining a combined prediction based on the distance metric and at least one of the regression model prediction or the artificial neural network prediction; and modifying a characteristic of the physical plant according to the combined prediction.

8. The method of claim 7, wherein determining the combined prediction comprises use of at least one of a weighted average or a Kalman filter.

9. The method of claim 7, wherein calculating the distance metric comprises use of the plant input data and at least one of a cluster distribution mean or a cluster centroid.

10. The method of claim 9, wherein the cluster distribution mean is identified using a Gaussian mixture model technique.

11. The method of claim 9, wherein the cluster centroid is identified using a k-means technique.

12. The method of claim 7, wherein the plant input data comprises at least one of manufacturing data and offsite data.

* * * * *